United States Patent [19]

Lauro et al.

[11] 4,178,021
[45] Dec. 11, 1979

[54] LEAK-TIGHT COUPLING DEVICE

[75] Inventors: Fernand Lauro, Grenoble; Roland Podevin, Saint Ismier, both of France

[73] Assignee: Commissariat a l'Energie Atomique, Paris, France

[21] Appl. No.: 898,981

[22] Filed: Apr. 21, 1978

[30] Foreign Application Priority Data

May 5, 1977 [FR] France .................................. 77 13699

[51] Int. Cl.² .................................................. F16L 33/22
[52] U.S. Cl. ......................................... 285/255; 285/259
[58] Field of Search ............... 285/255, 259, 243, 253, 285/252, 421, 330

[56] References Cited

U.S. PATENT DOCUMENTS

| | | | |
|---|---|---|---|
| 409,066 | 8/1889 | Ravenel | 285/243 |
| 1,802,499 | 4/1931 | Chapman | 285/259 X |
| 3,142,503 | 7/1964 | Stranberg et al. | 285/243 |
| 3,361,449 | 1/1968 | Parro | 285/255 X |

FOREIGN PATENT DOCUMENTS

| | | | |
|---|---|---|---|
| 534155 | 1/1922 | France | 285/255 |
| 542805 | 5/1922 | France | 285/255 |
| 986617 | 4/1951 | France | 285/255 |
| 387011 | 1/1933 | United Kingdom | 285/255 |

Primary Examiner—Thomas F. Callaghan
Attorney, Agent, or Firm—Lane, Aitken & Ziems

[57] ABSTRACT

The device for providing a leak-tight coupling between a flexible tube and a rigid coupling connector comprises two coaxial components adapted to fit one inside the other. One component is mounted within the flexible tube while the other component is fitted around the tube. Longitudinal ribs formed on one component are adapted to cooperate with longitudinal grooves in the other component at the time of interengagement of the two components. The end of the tube is thus clamped and securely held in position.

7 Claims, 6 Drawing Figures

LEAK-TIGHT COUPLING DEVICE

BACKGROUND OF THE INVENTION

The present invention relates to a device for providing a leak-tight coupling between a flexible tube and a rigid coupling connector having two coaxial components adapted to engage one inside the other. One component is mounted within the interior of the flexible tube and covered by this latter. The other component is mounted externally so as to surround said tube, the end of which is clamped between these two components.

A leak-tight coupling between a flexible tube and a rigid coupling connector is already provided by means of a number of known systems which make use of the general arrangements recalled in the foregoing. In particular, it has already been proposed to construct the coupling connector by means of two members which have a conical profile. One member is engaged within the flexible tube with slight force and the other member is fitted over the first and grips the end of the tube in a sandwich arrangement, both members being interlocked in such a manner as to clamp the tube between them.

A design solution of the type just described, one example of construction of which is illustrated in FIG. 1 of the accompanying drawings, is subject to certain disadvantages, especially when the flexible tube is of material having mechanical characteristics which weaken as a result of stress applied to said tube during use over a long period at high temperature, for example. In this case, the end portion 2 of the tube 1 is in fact force-fitted on the first member 3 of biconical shape which is so designed as to be substantially larger in diameter than the flexible tube. Said tube is thus subjected to tensile stress at the time of assembly and remains stressed throughout the service life of the coupling device. An outer ring 4 having the same profile as the end portion of the member 3 is adapted to cover this latter and is then thrust in the direction of forcible engagement by means of an extension member 5 which is screwed onto a threaded portion 6 of the member 3, thus clamping the end of the tube and securely holding this latter in position. However, if the diameter of the member 3 at the end portion 7 of this latter is practically equal to the nominal diameter of the tube, it is possible by means of a simple calculation based on the known angle of slope of the cone formed by said member to determine the increase in diameter of the tube in the zone 8 of larger diameter; this increase represents a not-negligible elongation in respect of this dimension and a value of stress which rapidly becomes excessive as a function of the modulus of elasticity of the material of said tube. Embrittlement of the tube in the zone of junction between this latter and the coupling connector consequently occurs and is particularly disadvantageous when this latter is employed in any atmosphere at higher than average temperatures.

SUMMARY OF THE INVENTION

The present invention relates to a coupling device which retains the principle of clamping the end portion of a flexible tube between two components of conical shape which engage one inside the other but in this case prevents any effort of extension on the tube and removes the resultant disadvantages.

To this end, the device under consideration comprises two coaxial components adapted to fit one inside the other, one component being mounted within and covered by the flexible tube and the other component being mounted externally around the flexible tube in such a manner that the end portion of said tube is clamped between said two components. The device is distinguished by the fact that one of the components of the coupling connector has longitudinal grooves formed as concave portions distributed in the surface of the connector and the other component has longitudinal ribs formed as convex portions, said ribs and grooves being adapted to cooperate with each other at the time of interengagement of said components so as to imprison the end portion of the tube.

Preferably, said ribs and grooves are arranged on both components at uniform angular intervals about their common axis.

In accordance with a particular feature, the externally mounted component is fitted by means of a fastening clip on the component which is mounted within the interior of the flexible tube, said fastening clip being constituted by two articulated jaws adapted to close one against the other and to define in the direction of interengagement of the two components a flared-out portion which permits of progressive engagement of the end of the tube between the ribs and the grooves.

Preferably, the jaws of the fastening clip are provided with means for locating the angular position of said clip with respect to the ribs and grooves of the two components.

BRIEF DESCRIPTION OF THE DRAWING

Further distinctive features of a leak-tight coupling device as constructed in accordance with the invention will become apparent from the following description of one exemplified embodiment which is given by way of indication and not in any limiting sense, reference being made to the accompanying drawings, in which.

DESCRIPTION OF THE PREFERRED EMBODIMENT

Figure 1:
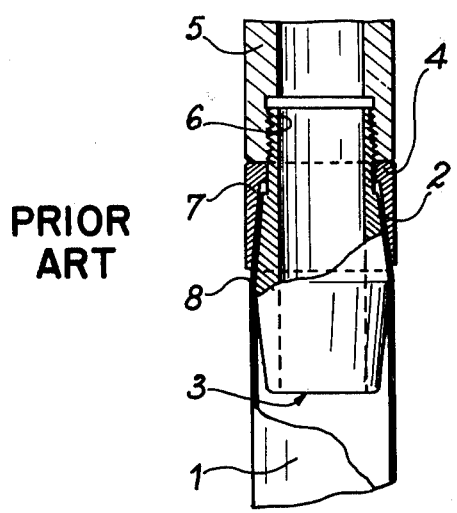
FIG. 1 is a partial, cross-sectional view of a known device.
Figure 2:
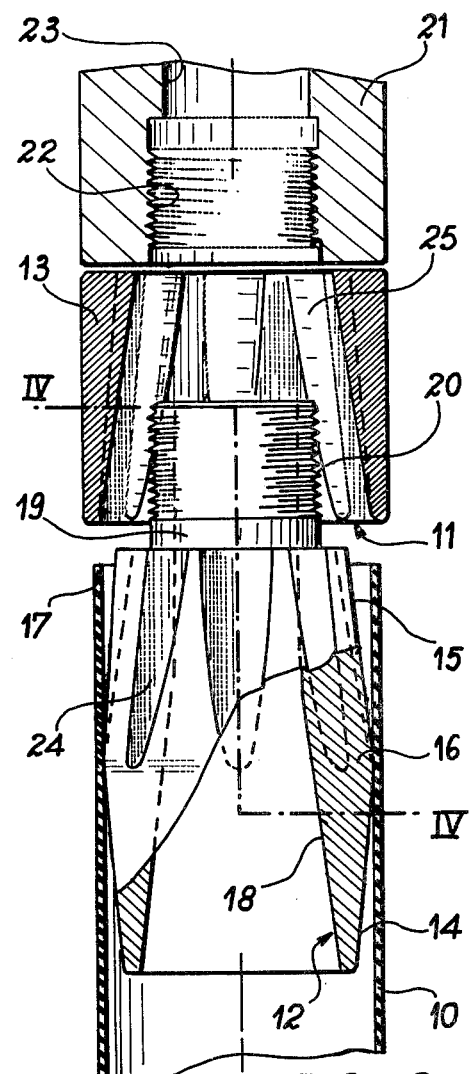
FIGS. 2 and 3 are diagrammatic sectional views of the device under consideration which illustrate in particular the members of the coupling connector, said members being capable of clamping the end portion of the flexible tube between them in two positions respectively before and after pinching-in of said tube.
Figure 3:
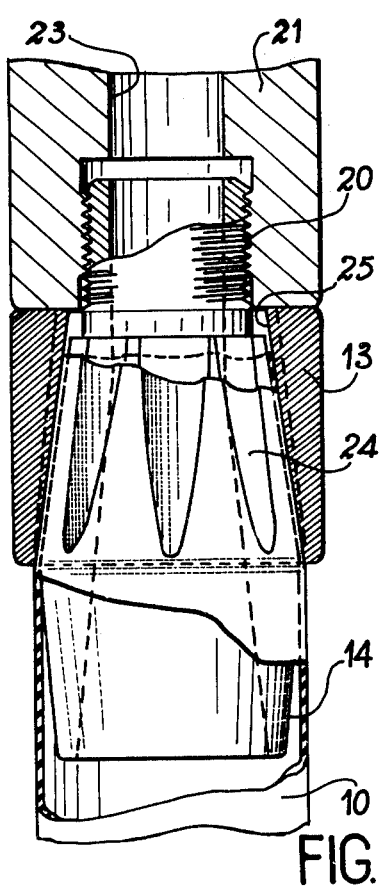

The leak-tight coupling device illustrated in FIGS. 2 and 3 serves to interassemble a flexible tube 10 and a coupling connector 11 which is designed in the form of two components. To this end, the coupling connector 11 has an internal member 12 provided externally with a biconical profile having surfaces 14 and 15 respectively which are inclined towards the interior of the member 12. The central portion 16 of said member 12 thus has the largest external diameter. The member 12 is so designed as to have a diameter at 16 which is equal at a maximum to the internal diameter of the tube 10. Said tube is thus capable of sliding over said member without being subjected either to any effort of extension or to any stress, the end portion 17 of the tube 10 being intended to come into position substantially at the level of the terminal edge of the conical surface 15. The member 12 is further provided with an internal bore 18 which serves to ensure continuity of the passage through the tube 10 and the coupling connector 11. Finally, said member 12 is provided at the opposite end with a cylindrical extension 19 having an externally threaded portion 20, the design function of which will be explained in detail hereinafter.

The end portion 17 of the flexible tube 10 which surrounds the member 12 is secured to this latter by means of a second member 13 which is intended to fit over the end portion of said tube 10 and serves to apply said end portion against the conical surface 15. To this end, said member 13 which forms a ring and is placed initially in the position of FIG. 2 is progressively thrust into position by means of an extension member 21 provided with an internally threaded portion 22 for securing said ring 13 on the externally threaded portion 20 of the member 12. This has the effect of applying an axial effort on said ring which is brought into the position illustrated in FIG. 3 at the end of travel. The extension member 21 can be a rigid tube mounted beyond the coupling connector 11 and also has an axial bore 23 which serves to ensure continuity of the passage formed with the flexible tube 10.

Figure 4:
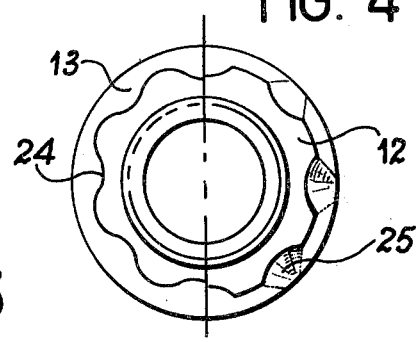
FIG. 4 is a sectional view taken along line IV—IV of FIG. 2.

In accordance with the invention, grooves and ribs 24 and 25 respectively are formed on the one hand on the external surface of the member 12 which is surrounded by the end portion 17 of the tube 10 and on the other hand on the internal surface of the member 13 which is intended to be fitted over said end portion 17. In the example under consideration, grooves are formed as concave portions in the member 12 and ribs are formed as convex portions on the member 13. As shown in the sectional view of FIG. 4, the profile of said ribs and grooves is chosen so as to ensure that each groove 24 corresponds to a rib 25 and conversely. Thus at the time of engagement of the member 13 on the member 12, the end portion 17 of the flexible tube 10 can be suitably folded within each groove in order to lock said tube in position with respect to the coupling connector in a suitable manner. Similarly, it would clearly be possible to form the ribs as convex portions on the member 12 and the grooves as concave portions in the member 13. In this case, the effect of cooperation of said grooves and of said ribs would remain unchanged.

Figure 5:
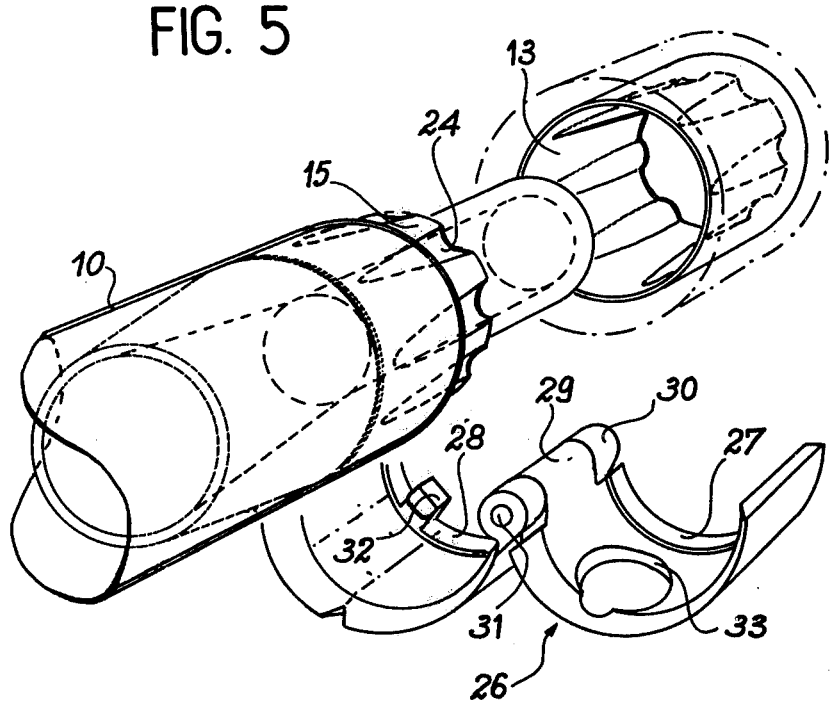
FIGS. 5 and 6 are views respectively in perspective and in cross-section which illustrate the members of the device and especially the fastening clip which permits of engagement of one component of the device both on the flexible tube and on the other component.
Figure 6:
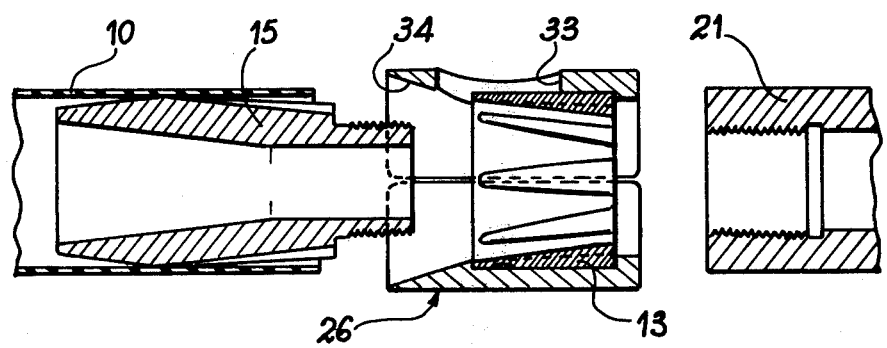

FIGS. 5 and 6 illustrate an improvement made in the foregoing arrangements in which it is possible in particular to mount the member 13 on the member 12 in a suitable manner and especially to ensure suitable relative angular positioning of the ribs and grooves. To this end, the member 13 is mounted within a fastening clip 26 having two jaws 27 and 28 each provided on one edge with hinge-knuckles 29 and 30 respectively which are associated with a hinge-pin 31. By moving the jaws 27 and 28 to a closed position in which they are applied one against the other as shown in FIG. 6, the fastening clip is thus permitted to imprison the member 13 between the jaws and to guide said member in a suitable manner as it is moved towards the member 12 over the end portion 17 of the tube 10. Provision can advantageously be made on one of the jaws of the fastening clip for a projecting lug 32 which is capable of cooperating with one of the grooves 24 of the member 12 or conversely. Alternatively, one of the jaws can also be provided with an opening 33 which makes it possible to locate the ribs and grooves in such a manner as to ensure suitable positioning of these latter. The two jaws 27 and 28 are also given a suitable internal profile such that a flared-out portion 34 is formed at the forward end in front of the housing provided for the member 13. Progressive engagement over the member 12 thus ensures uniform folding of the end portion 17 of the flexible tube 10 within the hollow grooves 24 and on the raised ribs 25.

Provision is thus made for a leak-tight coupling device which makes it possible to join a flexible tube to its rigid coupling connector in a particularly reliable and efficient manner without subjecting the wall of the flexible tube to any effort or extension, said tube wall being nevertheless securely clamped between the two components of the coupling connector once these latter have been assembled together. Advantageously although not in any limiting sense, a leak-tight coupling device of this type finds a particularly satisfactory application in flexible-tube heat-exchanger systems of the type employed in certain installations for desalination of sea water. By way of example, an improved form of construction of a heat exchanger of this type was described and claimed in French patent Application No. 76 16047 of May 26th, 1976 in the name of Commissariat à l'Energie Atomique in respect of "Heat exchanger of the falling-film type with vertical flexible tubes".

What we claim is:

1. A device for providing a leak-tight coupling between a flexible tube and a rigid coupling connector having two coaxial components adapted to fit one inside the other, the first component being mounted within and covered by the flexible tube and the second component being mounted externally around the flexible tube in such a manner that the end portion of said tube is clamped between said two components, wherein one of said first and second components of the coupling connector has a frusto-conical tube-engaging surface with concave, longitudinally extending grooves formed therein and the other component has a complimentary frusto-conical tube engaging surface with convex longitudinally extending ribs formed thereon, said ribs and grooves being adapted to cooperate with each other at the time of inter-engagement of said components so as to imprison said end portion of the tube.

2. A leak-tight coupling device according to claim 1, wherein the ribs and grooves have the same profile.

3. A leak-tight coupling device according to claim 1, wherein the ribs and grooves are arranged on both components at uniform angular intervals about their common axis.

4. A leak-tight coupling device according to claims 1, 2, or 3, wherein the externally mounted component is fitted by means of a fastening clip on the component which is mounted within the interior of the flexible tube, said fastening clip being constituted by two articulated jaws adapted to close one against the other and to define in the direction of interengagement of the two components a flared-out portion which permits of progressive engagement of the end of the tube between the ribs and the grooves.

5. A leak-tight coupling device according to claim 4, wherein the jaws of the fastening clip are provided with means for locating the angular position of said clip with respect to the ribs and grooves of the two components.

6. A leak-tight coupling device according to any one of claims 1, 2, or 3 wherein the component which is mounted within the flexible tube is provided with a threaded axial extension, the component mounted externally of the tube being formed by two coaxial members such that the first member is adapted to cooperate with the other member in order to imprison the flexible tube and the second member which is freely rotatable with respect to the first is provided axially with an internally threaded portion adapted to engage the threaded extension so that the two components aforesaid are coupled together by threading.

7. A leak-tight coupling device according to claims 1, 2, or 3 wherein the ribs are located on the first component and the grooves are located on the second component.

* * * * *